(12) United States Patent
Li et al.

(10) Patent No.: US 10,969,568 B1
(45) Date of Patent: Apr. 6, 2021

(54) ANAMORPHIC LENS

(71) Applicant: Zhongshan AZU Optoelectronics Technology Co., Ltd., Zhongshan (CN)

(72) Inventors: Jie Li, Zhongshan (CN); Wei Wu, Zhongshan (CN); Yu Mai, Zhongshan (CN)

(73) Assignee: ZHONGSHAN AZU OPTOELECTRONICS TECHNOLOGY CO., LTD., Zhongshan (CN)

( * ) Notice: Subject to any disclaimer, the term of this patent is extended or adjusted under 35 U.S.C. 154(b) by 0 days.

(21) Appl. No.: 17/003,953

(22) Filed: Aug. 26, 2020

Related U.S. Application Data

(63) Continuation of application No. PCT/CN2020/101864, filed on Jul. 14, 2020, and a continuation-in-part of application No. 16/753,399, filed as application No. PCT/CN2019/108977 on Sep. 29, 2019.

(30) Foreign Application Priority Data

Sep. 26, 2019 (CN) .......................... 201910916059.8
Jul. 9, 2020 (CN) .......................... 202010659844.2

(51) Int. Cl.
G02B 13/08 (2006.01)
G02B 13/00 (2006.01)
G02B 9/64 (2006.01)
G02B 13/06 (2006.01)

(52) U.S. Cl.
CPC ............... *G02B 13/08* (2013.01); *G02B 9/64* (2013.01); *G02B 13/005* (2013.01); *G02B 13/06* (2013.01)

(58) Field of Classification Search
CPC ...... G02B 13/08; G02B 13/005; G02B 13/06; G02B 9/64
See application file for complete search history.

(56) References Cited

U.S. PATENT DOCUMENTS

| 6,310,731 B1 * | 10/2001 | Wartmann | G02B 13/08 359/649 |
| 6,512,636 B2 * | 1/2003 | Schauss | G02B 13/08 359/668 |
| 7,755,842 B2 * | 7/2010 | Rutzen | G01J 3/02 359/668 |
| 8,801,197 B2 * | 8/2014 | Morikuni | G03B 21/142 353/101 |

(Continued)

*Primary Examiner* — Balram T Parbadia
(74) *Attorney, Agent, or Firm* — Loeb & Loeb LLP

(57) ABSTRACT

An ultra-wide-angle large-aperture anamorphic lens includes a cylindrical lens group and a spherical lens group arranged in sequence from the object side to the image side. The cylindrical lens group includes a first lens, a second lens, the third lens and the fourth lens. The first lens and the second lens are negative refractive power cylindrical lenses, and the third lens and the fourth lens are positive refractive power cylindrical lenses. The spherical lens group includes a fifth lens, a sixth lens, . . . , a thirteenth lens that are sequentially arranged along the direction that the optical path points to the image side. A 2.4:1 widescreen video or photo may be obtained; at the same time, because the anamorphic lens is a front anamorphic design, in addition to the anamorphic function, it will also have optical characteristics such as elliptical out-of-focus flare and sci-fi line flare.

17 Claims, 4 Drawing Sheets

(56) References Cited

U.S. PATENT DOCUMENTS

| | | | | |
|---|---|---|---|---|
| 2006/0050403 A1* | 3/2006 | Neil | ............... | G02B 13/08 |
| | | | | 359/668 |
| 2009/0268305 A1* | 10/2009 | Pretorius | ............ | G02B 13/08 |
| | | | | 359/668 |
| 2010/0079874 A1* | 4/2010 | Kamei | ............. | G02B 13/06 |
| | | | | 359/668 |

* cited by examiner

ANAMORPHIC LENS

CROSS-REFERENCE TO RELATED APPLICATIONS

This is a US continuation application of PCT international application serial number PCT/CN2020/101864, filed on Jul. 14, 2020, which claims priority to a Chinese patent application, application number 202010659844.2, filed on Jul. 9, 2020. All these applications are incorporated by reference in their entirety herein.

TECHNICAL FIELD

The present invention relates to the field of lens technology, in particular to a half-frame large aperture deformable lens with a focal length of 24 mm.

BACKGROUND

With the rapid development of web technology, taking photos and videos has become essential part for ordinary consumers. With the promotion of 5G and other technologies in recent years, more and more video sharing such as Vlog has been used. More individuals shoot short films and micro movies with mobile phones, cameras and other tools.

However, the current normal shooting screen ratio of mobile phones, tablets, cameras and other devices on the market is 16:9, but the cinematic widescreen video ratio is 2.4:1. Therefore, users need to manually edit or digitally cropping method to edit the captured images or videos. However, the pixels of the pictures are sacrificed during cropping or editing.

Some professional anamorphic lens brands such as, Hawk from Germany, Cooke from Great Britain, ARRI from Germany, Panavision from the USA, Angenieux from France and SLR from Hong Kong are usually tailored for professional customers. The prices of these film equipment are generally over tens of thousands of dollars or even more expensive, and anamorphic lenses themselves weighs several kilograms.

Expensive and quality professional anamorphic lenses are not suitable for ordinary users. Therefore, how to reduce the size of super wide-angle large aperture anamorphic lens and reducing the weight of the lens are technical problems that are to be solved at present embodiments of the invention.

SUMMARY

Therefore, embodiments of the invention attempt technically solve shortcomings in the professional super wide-angle large aperture anamorphic lens where the quality is great but at a cost that ordinary consumers could not afford. Aspects of the invention provide a super wide-angle large aperture anamorphic lens that solve the technical problem with the following embodiments:

A super wide-angle large aperture anamorphic lens may include a cylindrical lens group and a spherical lens group in an arrangement of an object side to an image side. The cylindrical lens group may include, from the object side to the image side, a first lens, a second lens, a third lens, and a fourth lens in a sequential order. In one embodiment, the first lens and the second lens may be negative optical power cylindrical lens. The third and the fourth lenses may be positive optical power cylindrical lenses. In addition, the generatrix of the fourth lens is perpendicular to the generatrix of the third lens. The spherical lens group is provided with a fifth lens, a sixth lens . . . to Nth lens, where N is greater than or equal to a natural number of 10, in sequence along the direction of the optical path pointing to the image side.

The power distribution of the lenses constituting the cylindrical group and the spherical group may satisfy the following relationship:

$$23.6 \text{ mm} < f_{(1-N)}Y < 24.4 \text{ mm};$$

$$17.6 \text{ mm} < f_{(1-N)}X < 19.2 \text{ mm};$$

$$1.20 < f_{(1-N)}Y/f_{(1-N)}X < 1.40;$$

$$3.50 < f_4Y/f_{(2-3)}Y < 4.20;$$

In one embodiment, the X direction is the curvature direction of the first lens, and the Y direction is the other direction that is 90 degrees to the curvature direction of the first lens. Among them, the subscript number off may represent the number of each lens constituting the anamorphic lens. Function $f_{(M-N)}Y$ may represent the combined optical focal length of the total (N−M+1) lens in the Y direction from the Mth lens to the Nth lens. The function $f_{(M-N)}X$ may represent the combined optical focal length of the total (N−M+1) lens in the X direction from the Mth lens to the Nth lens. M comprises a natural number greater than or equal to 1 and less than N.

Further, the spherical lens group is provided with a fifth lens, a sixth lens, a seventh lens, an eighth lens, a ninth lens, a tenth lens, an eleventh lens, a twelfth lens and a thirteenth lens in sequence along a direction in which the optical path points to the image side.

Further, the first lens may be a front stationary group of the anamorphic lens, the second lens to the sixth lens may serve as an inner focus group of the anamorphic lens, and the seventh lens to the thirteenth lens may serve as a rear stationary group of the anamorphic lens. In one embodiment, the power distribution of the front stationary group, the inner focus group and the rear stationary group may satisfy the following relationship:

$$-3.10 < f_1 X / f_{(1-13)} X < -2.70;$$

$$-2.10 < f_{(2-6)} Y / f_{(1-13)} Y < -1.60;$$

$$-10.20 < f_{(2-6)} X / f_{(1-13)} X < -9.20;$$

$$2.40 < f_{(7-13)} X / f_{(1-13)} X < 2.80;$$

In one embodiment, the X direction is the curvature direction of the first lens, and the Y direction is the other direction that is 90 degrees to the curvature direction of the first lens. Among them, the subscript number off may represent the number of each lens constituting the anamorphic lens. Function $f_{(M-N)}Y$ may represent the combined optical focal length of the total (N−M+1) lens in the Y direction from the Mth lens to the Nth lens. The function $f_{(M-N)}X$ may represent the combined optical focal length of the total (N−M+1) lens in the X direction from the Mth lens to the Nth lens. M comprises a natural number greater than or equal to 1 and less than N.

In a further embodiment, the fifth lens, the ninth lens, and the tenth lens may be all negative refractive power spherical lenses; and the sixth lens, the seventh lens, the eighth lens, the eleventh lens, the twelfth lens and the thirteenth lens may all be positive refractive power spherical lenses.

In a further embodiment, the generatrix of the fourth lens and the generatrix of the third lens may be perpendicular to each other.

In a further embodiment, the second lens and the third lens may be joined or cemented together.

In a further embodiment, the eighth lens and the ninth lens may be joined or cemented together.

In a further embodiment, the tenth lens and the eleventh lens may be joined or cemented together.

In a further embodiment, the length of the anamorphic lens may be less than 130 mm, and the front end may match a common filter with a diameter of 67 mm.

In a further embodiment, the focal length in the Y direction of the anamorphic lens is 24.4 mm, the focal length in the X direction is 18.3 mm, and the aperture is 2.8.

In a further embodiment, a mass of the anamorphic lens is less than 750 g.

The technical solution of the present invention has the following advantages:

1. The super wide-angle large-aperture anamorphic lens provided by aspects of the invention use an overall design method to correct the overall aberrations of four cylindrical lenses and nine spherical lenses, thereby shooting the lens horizontally while increasing an angle of field of view. As a result, the actual shooting picture width becomes larger. There would be no need for post-editing, and 2.4:1 widescreen video or photos may be obtained without sacrificing pixels. At the same time, aspects of the invention may be a front-end anamorphic design, in addition to the anamorphic function, the anamorphic lens of aspects of embodiments may also provide optical characteristics such as elliptical out-of-focus flare and sci-fi line flare.

2. The ultra or super wide-angle large aperture anamorphic lens provided by aspects of the invention include a unique optical structure using X-direction and Y-direction cylindrical lenses for a comprehensive design. In one embodiment, the generatrixs of the first lens, the second lens and the third lens may be parallel to each other. The generatrix of the fourth lens may be perpendicular to the generatrix of the first three cylindrical lenses. Due to the non-rotationally symmetrical optical properties of the cylindrical lens, the cylindrical lens may enable in the Y direction the correction of the astigmatic aberration of the anamorphic lens.

3. The super wide-angle large aperture anamorphic lens provided by yet another embodiment of the present invention may include an inner focus design. For example, the first lens of the 13 lenses may be arranged in sequence from the object side to the image side and may be used as the front stationary group. The second lens to the sixth lens may be used as the inner focus group and the seventh lens to the thirteenth lens may be used as the rear fixed group. Through the movement of the inner focus group inside the lens, the lens may focus on different object distances.

4. The super wide-angle large aperture anamorphic lens provided by a further embodiment of the present invention may be in a compact design integrating a cylindrical lens and a spherical lens. As such, aspects of the invention may form a lightweight design while achieving a large aperture of F2.8. In particular, the length of the lens is less than 130 mm, the front end of the lens may be matched with 67 mm diameter universal filter, and a mass of the lens may be less than 750 grams (g).

BRIEF DESCRIPTION OF DRAWINGS

In order to more clearly illustrate the specific embodiments of the present invention or the technical solutions in the prior art, the drawings needed to be used in embodiments or the description of the prior art are briefly introduced below. Obviously, the drawings in the following are some embodiments of the present invention. For those of ordinary skill in the art, other drawings may be obtained based on these drawings without undue creative labor.

Figure 1:
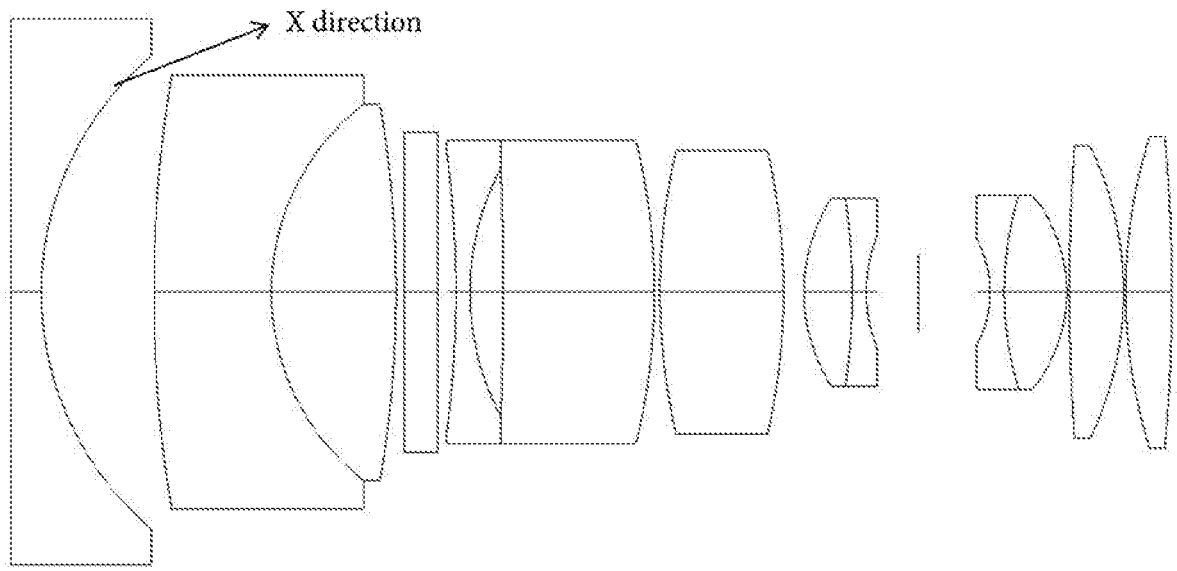
FIG. 1 is a cross-section view in an X direction according to one embodiment of the present invention.

The following lists the labels for the reference numbers:

1—first lens; 2—second lens; 3—third lens; 4—fourth lens; 5—fifth lens; 6—sixth lens; 7—seventh lens; 8—eighth lens; 9—ninth lens; 10—tenth lens; 11—eleventh lens; 12—twelfth lens; 13—anamorphic group; 14—front stationary group; 15—inner focus group; 16—rear stationary group.

DETAILED DESCRIPTION

The technical solution of the present invention may be clearly and completely described below with reference to the accompanying drawings. Obviously, the described embodiments may be part of the present invention, but not all of them. Based on the embodiments of the present invention, all other embodiments obtained by a person of ordinary skill in the art without creative efforts shall fall within the protection scope of the present invention.

In the description of the present invention, it is noted that the terms "center", "up", "down", "left", "right", "vertical", "horizontal", "inside", "outside", etc., are meant to indicate orientation or positional relationship and they may be based on the orientation or positional relationship shown in the drawings, and may only be for the convenience of describing the present invention and simplified description, and does not indicate or imply that the device or element referred to must have a specific orientation, a specific construction and operation as they are not be construed as limiting the invention. In addition, the terms "first," "second," and "third" may be used for descriptive purposes only, and should not be construed to indicate or imply relative importance.

In the description of embodiments of the present invention, it is noted that the terms "installation", "connected", and "connected" should be understood in a broad sense unless otherwise specified and limited. For example, they may be fixed connections or removable, connected or integrated; it may be mechanical or electrical; it may be directly connected, or it may be indirectly connected through an intermediate medium, or it may be the internal communication of two elements. For those of ordinary skill in the art, the specific meanings of the above terms of embodiments of the present invention may be understood in a case-by-case basis.

In addition, the technical features involved in the different embodiments of the present invention described below may be combined with each other as long as they do not conflict with each other.

Example 1

Figure 3:
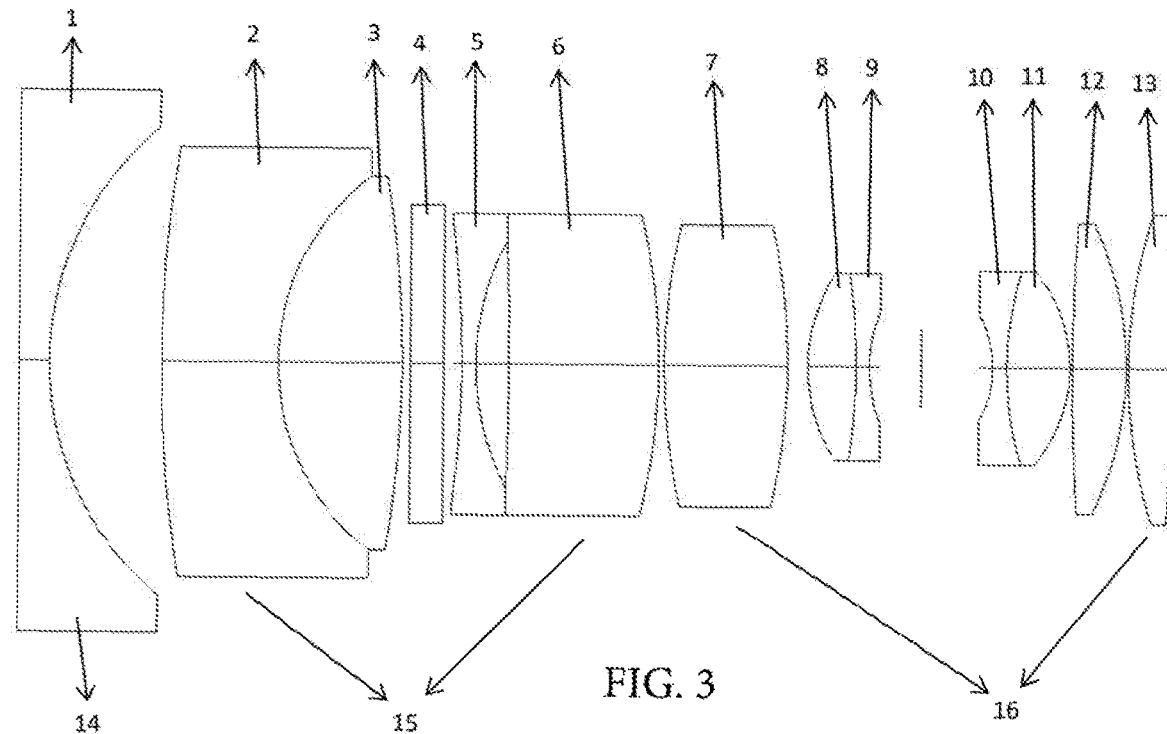
FIG. 3 is an optical structure diagram in an X direction according to a first embodiment of the present invention.
Figure 4:
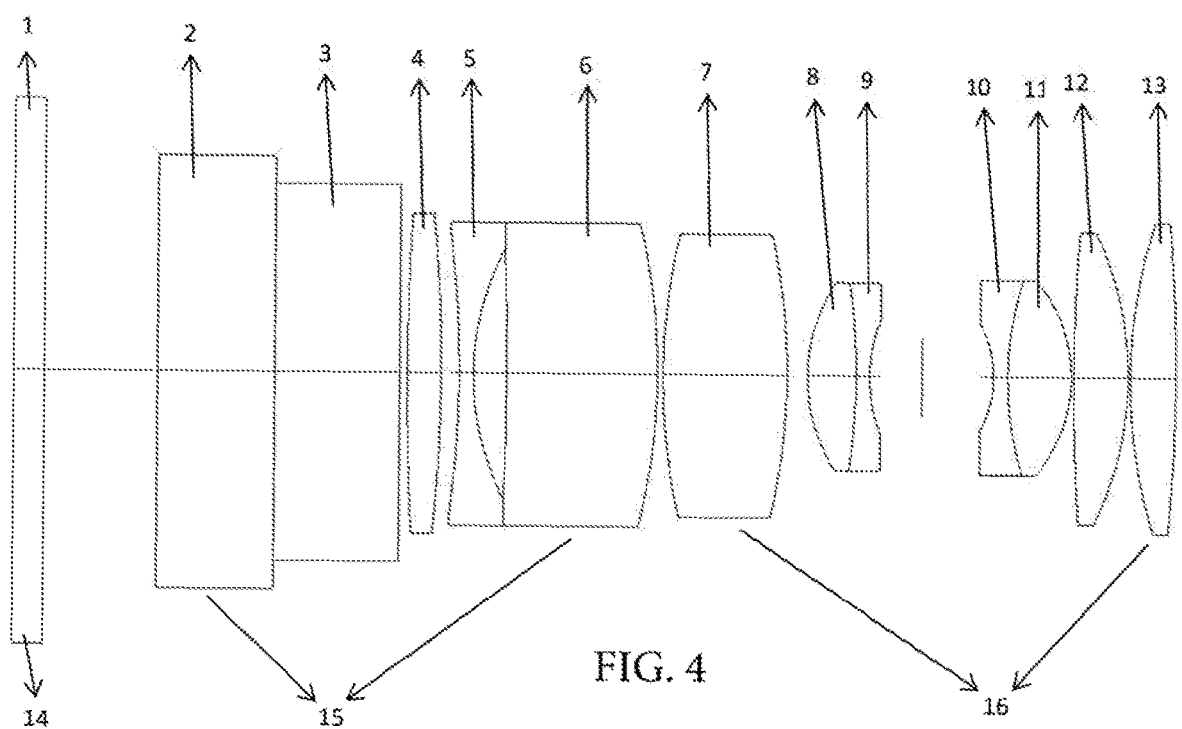
FIG. 4 is an optical structure diagram in an Y direction according to a first embodiment of the present invention.

According to one embodiment, a 24 mm focal length, half-frame, super wide-angle large-aperture anamorphic lens may be shown in FIGS. 3-4. In one example, the anamorphic lens may include 13 lenses arranged along an optical path from the object side to an image side from a first lens 1, a second lens 2, a third lens 3, a fourth lens 4, a fifth lens 5, a sixth lens 6, a seventh lens 7, an eighth lens 8, a ninth lens 9, a tenth lens 10, an eleventh lens 11, a twelfth lens 12 and a thirteenth lens 13.

In one embodiment, the first lens 1, the second lens 2, the third lens 3 and the fourth lens 4 may be cylindrical lenses. In one embodiment, the second lens 2 and the third lens 3 may be joined or cemented together. In another embodiment, the fifth lens 5, the sixth lens 6, the seventh lens 7, the eighth lens 8, the ninth lens 9, the tenth lens 10, the eleventh lens 11, the twelfth lens 12 and the thirteenth lens 13 may be spherical lens.

In yet another embodiment, the first lens 1 and the second lens 2 may be negative cylindrical lenses, while the third lens 3 and the fourth lens 4 may be positive power cylindrical lenses. In another embodiment, the generatrix of the fourth lens may be perpendicular to generatrix of the third lens. The fifth lens 5, the ninth lens 9, and the tenth lens 10, in one embodiment, may all be negative refractive power spherical lenses. In another embodiment, the sixth lens 6, the seventh lens 7, the eighth lens 8, the eleventh lens 11, the twelfth lens 12, and the thirteenth lens 13 may be spherical lens with positive refractive power. In another embodiment, the eighth lens 8 and the ninth lens 9 may be joined or cemented together, and the tenth lens 10 and the eleventh lens 11 may be joined or cemented together.

In one embodiment, the joined or cemented lenses are regarded as an integral unit. Therefore, the anamorphic lens of this embodiment may be composed of 13 lenses in 10 groups.

In another embodiment, there are no specific limitations on the combination of the second lens 2 and the third lens 3; the eighth lens 8 and the ninth lens 9; the tenth lens 10 and the eleventh lens 11. In one embodiment, the combination method may include bonding with an adhesive. As an alternative embodiment, other combination method may be used without departing from the scope and spirit of the invention. In order to be distinguished from the present application, one may modify the above example of the combination method, such as bonding, integral molding, etc. These methods may also adaptively change or modify the combined lens shape. These alternative approaches are also within the scope and spirit of protection of this application.

The specific values of the actual parameters of each lens are not specifically limited. In this embodiment, the refractive power of each lens or lens group satisfies the following mathematical relationship:

$$23.6 \text{ mm} \leq f_{(1-N)}Y < 24.4 \text{ mm};$$

$$17.6 \text{ mm} \leq f_{(1-N)}X < 19.2 \text{ mm};$$

$$1.20 < f_{(1-N)}Y/f_{(1-N)}X < 1.40;$$

$$3.50 < f_4 Y/f_{(2-3)}X < 4.20;$$

$$-3.10 < f_1 X/f_{(1-13)}X < -2.70;$$

$$-2.10 < f_{(2-6)}Y/f_{(1-13)}Y < -1.60;$$

$$-10.20 < f_{(2-6)}X/f_{(1-13)}X < -9.20;$$

$$2.40 < f_{(7-13)}X/f_{(1-13)}X < 2.80.$$

Figure 2:
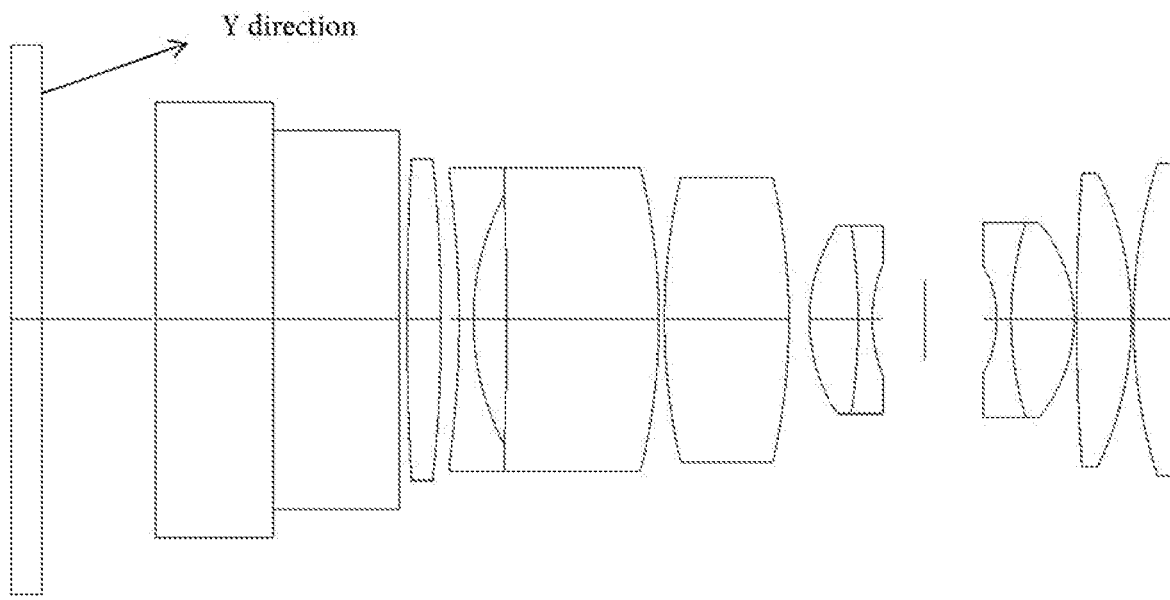
FIG. 2 is a cross-section view in an Y direction according to one embodiment of the present invention.

Due to the non-rotational property of the cylindrical lens, the X direction may be the curvature direction of the first lens (as shown in FIG. 1), and the Y direction may be the other direction that is 90 degrees to the curvature of the first lens (as shown in FIG. 2). In one embodiment, the subscript number of f may represent the number of each lens constituting the anamorphic lens. Function $f_{(M-N)}Y$ may represent the combined optical focal length of the total (N−M+1) lens in the Y direction from the Mth lens to the Nth lens. The function $f_{(M-N)}X$ may represent the combined optical focal length of the total (N−M+1) lens in the X direction from the Mth lens to the Nth lens. M comprises a natural number greater than or equal to 1 and less than N.

The following table may include parameters of each lens in this embodiment that comply with the above mathematical relationship:

TABLE 1

| Lens | Surface Shape | X radius (mm) | Y radius (mm) | Thickness (mm) | Refractive index | Abbe Number | Mass (g) |
| --- | --- | --- | --- | --- | --- | --- | --- |
| First lens | Cylindrical | Inf | Inf | 3.220 | 1.63 | 60.2 | Appx. 46.5 |
|  | Cylindrical | 32.720 | Inf | 12.100 |  |  |  |
| Second lens | Cylindrical | 138.252 | Inf | 12.440 | 1.75 | 27.2 | Appx. 66.3 |
| Third lens | Cylindrical | 25.305 | Inf | 13.220 | 1.90 | 35.3 | Appx. 67.6 |
|  | Cylindrical | −118.900 | Inf | 1.000 |  |  |  |
| Fourth lens | Cylindrical | Inf | 292.284 | 3.620 | 1.49 | 70.4 | Appx. 7.2 |
|  | Cylindrical | inf | −161.890 | 1.920 |  |  |  |
| Fifth lens | Spherical | −113.652 | −113.652 | 1.520 | 1.90 | 35.2 | Appx. 13.6 |
|  | Sperhical | 28.240 | 28.240 | 3.550 |  |  |  |
| Sixth lens | Spherical | 327.020 | −327.020 | 16.000 | 1.66 | 33.8 | Appx. 32.4 |
|  | Spherical | −67.080 | −67.080 | 0.400 |  |  |  |
| Seventh lens | Spherical | 67.362 | 67.362 | 13.100 | 1.80 | 46.6 | Appx. 34.7 |

TABLE 1-continued

| Lens | Surface Shape | X radius (mm) | Y radius (mm) | Thickness (mm) | Refractive index | Abbe Number | Mass (g) |
|---|---|---|---|---|---|---|---|
|  | Spherical | −67.362 | −67.362 | 2.200 |  |  |  |
| Eighth lens | Spherical | 18.485 | 18.485 | 5.120 | 1.83 | 42.7 | Appx. 4.8 |
| Ninth lens | Spherical | −69.140 | −69.140 | 1.520 | 1.64 | 36.0 | Appx. 2.3 |
|  | Spherical | 16.435 | 16.435 | 5.500 |  |  |  |
| Light bar | Spherical | −Inf | −Inf | 7.700 |  |  |  |
| Ten lens | Spherical | −11.962 | −11.962 | 1.530 | 1.92 | 20.9 | Appx. 4.6 |
| Eleventh lens | Spherical | 35.138 | 35.138 | 6.700 | 1.49 | 70.4 | Appx. 3.4 |
|  |  | −16.018 | −16.018 | 0.280 |  |  |  |
| Twelfth lens | Spherical | 218.583 | 218.583 | 5.750 | 1.90 | 31.3 | Appx. 10.2 |
|  | Spherical | −35.606 | −35.606 | 0.230 |  |  |  |
| Thirteenth lens | Spherical | 54.890 | 54.890 | 4.900 | 1.90 | 35.4 | Appx. 13.1 |
|  | Spherical | −181.985 | −181.985 | 18.000 |  |  |  |

In one embodiment, the first to fourth lenses may be cylindrical lenses, and the generatrix of the fourth lens may be perpendicular to the generatrix of the third lens, and the fifth to thirteenth lenses may be spherical lenses.

In prior approaches of the anamorphic lens, the field of view angle of the lens with a focal length of 24 mm and a 2.8 aperture is: V (vertical) 36.10°, and H (horizontal) 51.62°.

According to one embodiment of the invention, the field of view angle of the lens with a focal length of 24 mm and an aperture of 2.8 is: V (Vertical) 36.10°, and H (Horizontal) 68.75°. The angle of the field of view in the comparison test remains unchanged in the vertical direction, and the deformation ratio of the field of view in the horizontal direction is:

68.75/51.62=1.332.

In one embodiment, the actual wide format ratio may be in the range of 2.35-2.40, so the distortion ratio of about 1.33, that is, the horizontal field of view angle is increased by 33%, thus realizing 1.33× distortion shooting.

When the anamorphic lens of this embodiment is produced, the length of the anamorphic lens itself may be less than 130 mm, and it matches the general specification filter with an outer diameter of 67 mm. In another embodiment, the mass is less than 750 g, and the volume and mass are much smaller than that of professional film anamorphic lenses of the same specification on the market.

Among them, there are no limitations on the material for each lens. In this embodiment, each lens may be made of optical glass.

The lens of this application may further be designed to be compatible with the bayonet of cameras of various brands on the market according to actual use requirements, so as to achieve personalized customization and universal interoperability.

Embodiment 2

Figure 5:
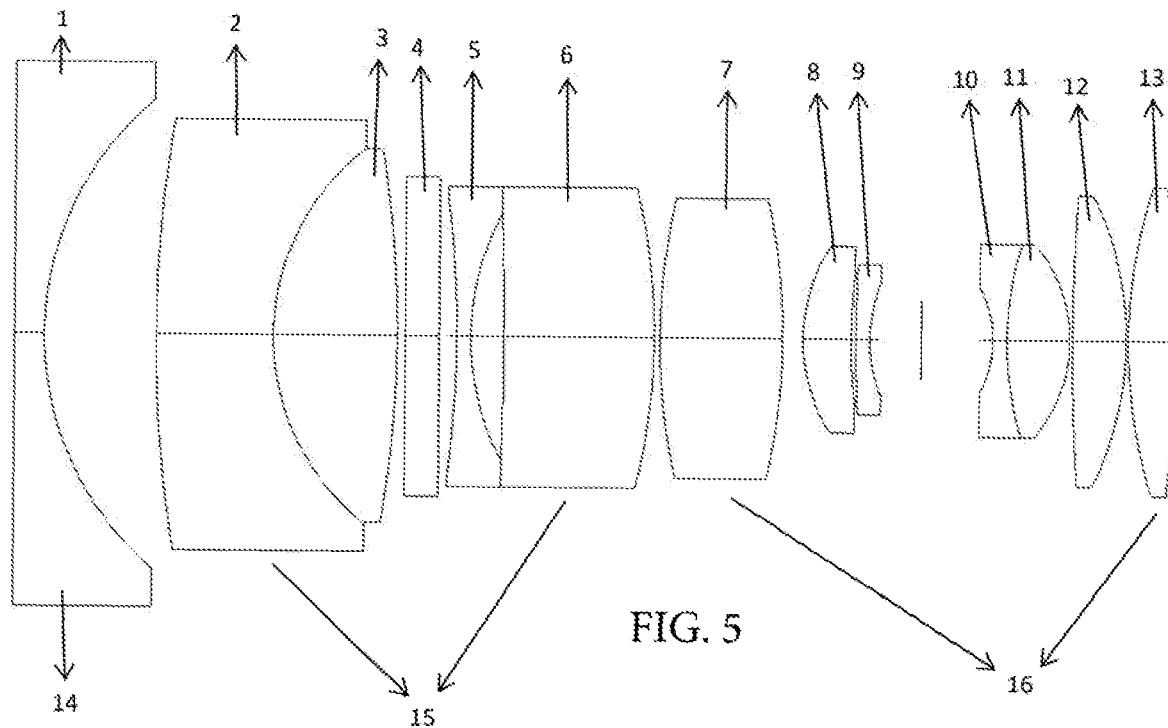
FIG. 5 is an optical structure diagram in an X direction according to a second embodiment of the present invention.
Figure 6:
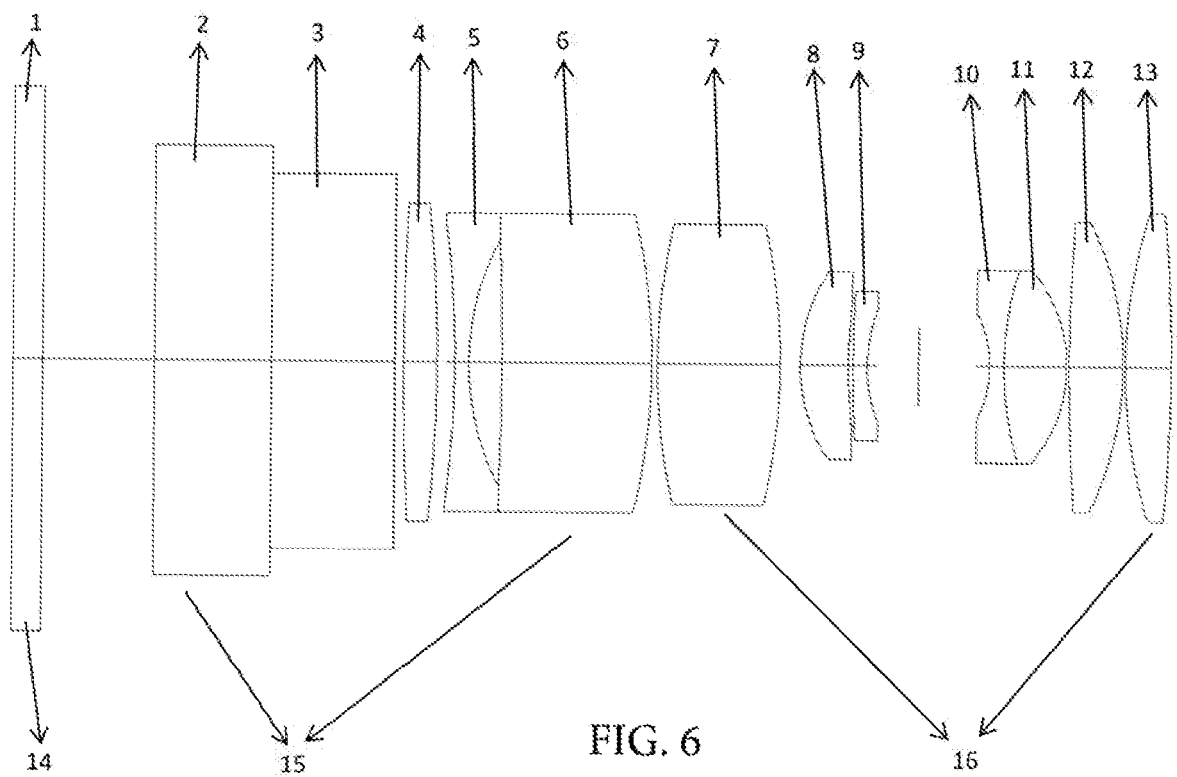
FIG. 6 is an optical structure diagram in an Y direction according to a second embodiment of the present invention.

As shown in FIG. 5 and FIG. 6, this embodiment may provide a 24 mm focal length half-frame super wide-angle large aperture anamorphic lens. The difference between the first embodiment and this embodiment is that this embodiment may include a positive spherical lens and a negative spherical lens to replace the original eighth lens 8 and the ninth lens 9 which are joined or cemented together.

Embodiment 3

Figure 7:
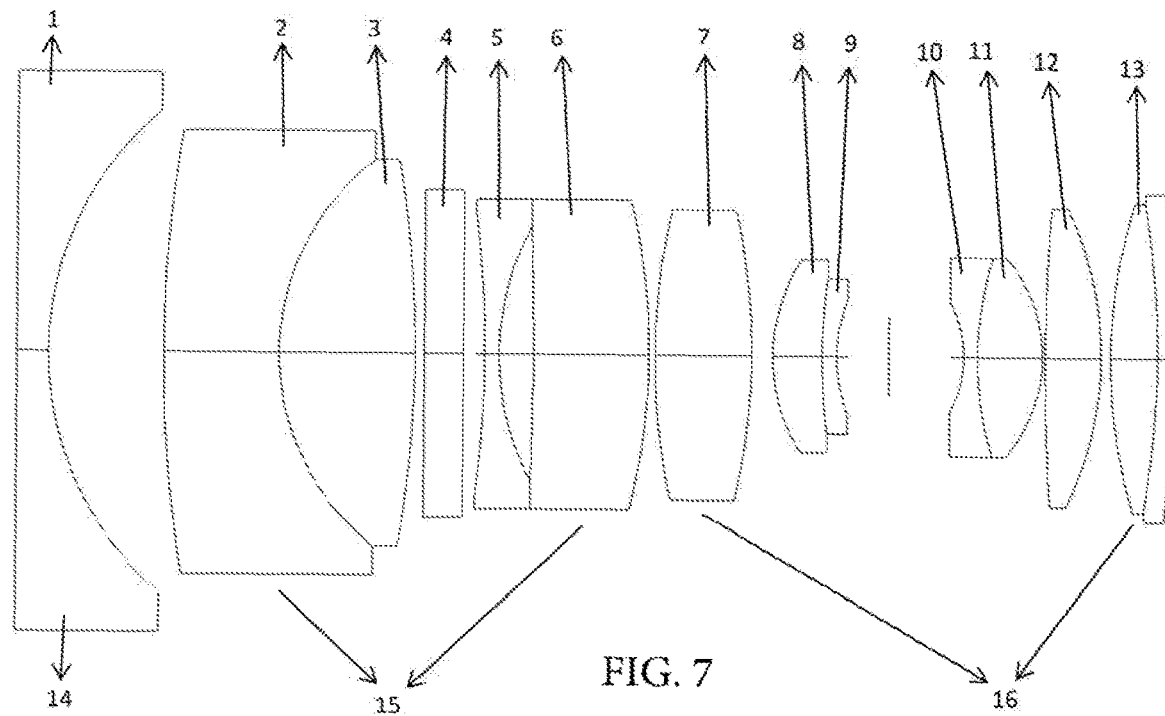
FIG. 7 is an optical structure diagram in an X direction according to a second embodiment of the present invention.
Figure 8:
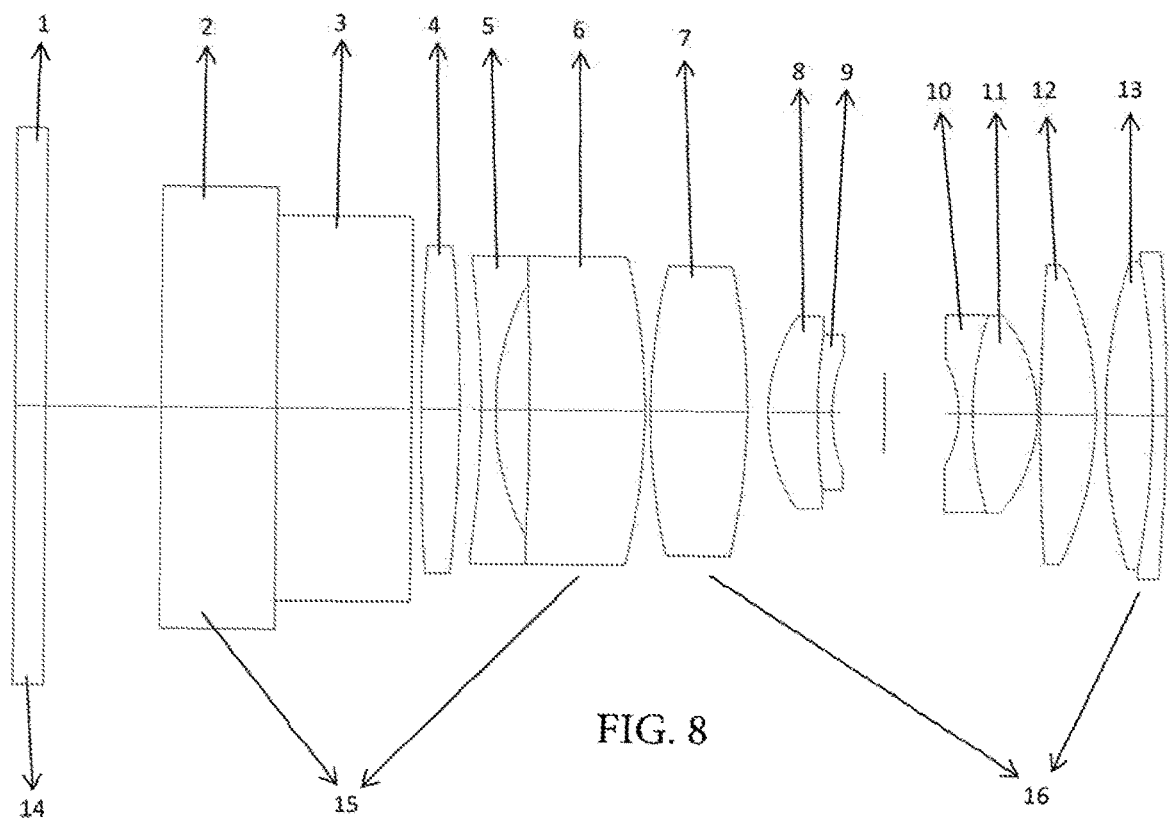
FIG. 8 is an optical structure diagram in an Y direction according to a second embodiment of the present invention.

As shown in FIGS. 7 and 8 this embodiment may provide a 24 mm focal length half-frame super wide-angle large aperture anamorphic lens. The difference between this embodiment and the first embodiment is that the original thirteenth lens 13 is replaced with a positive power spherical lens and a negative power lens. The spherical lens is joined or cemented into a positive cemented lens.

Aspects of the invention may be based on the first, second, and third embodiments. If only a single positive lens or a negative lens is simply split or separated, as long as the power distribution of the split lens group is within the scope of the original solution, no substantial innovation may be attributed to such variation.

Moreover, there is no need and cannot be exhaustive for all implementations. However, the obvious changes or variations introduced thereby are still within the protection scope created by the present invention.

The invention claimed is:

1. A super wide-angle large aperture anamorphic lens comprising:
a cylindrical lens group and a spherical lens group in an arrangement of an object side to an image side; wherein the cylindrical lens group comprises, from the object side to the image side, a first lens (1), a second lens (2), a third lens (3), and a fourth lens (4) in a sequential order; wherein the first lens (1) and the second lens (2) comprise negative optical power cylindrical lenses, wherein the third lens (3) and the fourth lens (4) comprise positive optical power cylindrical lenses; wherein the spherical lens group comprises a fifth lens (5), a sixth lens (6) . . . to Nth lens, where N is greater than or equal to a natural number of 10, in sequence along the direction of the optical path pointing to the image side;
a power distribution of the lenses constituting the cylindrical group and the spherical group may satisfy the following relationship:

$23.6 \text{ mm} < f_{(1-N)}Y < 24.4 \text{ mm}$;

$17.6 \text{ mm} < f_{(1-N)}X < 19.2 \text{ mm}$;

$1.20 < f_{(1-N)}Y / f_{(1-N)}X < 1.40$;

$3.50 < f_4 Y / f_{(2-3)}X < 4.20$;

wherein a X direction is a curvature direction of the first lens, and a Y direction is the other direction that is 90 degrees to the curvature direction of the first lens, wherein the subscript number off comprises a number of each lens, wherein $f_{(M-N)}Y$ comprises a combined optical focal length of the total (N−M+1) lens in the Y direction from a Mth lens to a Nth lens, wherein $f_{(M-N)}X$ comprises a combined optical focal length of the total (N−M+1) lens in the X direction from the Mth lens to the Nth lens, wherein M comprises a natural number greater than or equal to 1 and less than N.

2. The according to claim 1, wherein the spherical lens group comprises a fifth lens (5), a sixth lens (6), a seventh lens (7), the eighth lens (8), the ninth lens (9), the tenth lens (10), the eleventh lens (11), the twelfth lens (12) and the thirteenth lens (13).

3. The super wide-angle large aperture anamorphic lens according to claim 2, wherein the first lens (1) comprises a front stationary group (14), wherein the second lens (2) to the sixth lens (6) comprise an inner focus group (15), and the seventh lens (7) to the thirteenth lens (13) comprise as a rear stationary group (16); wherein a power distribution of the front stationary group (14), the inner focus group (15) and the rear stationary group (16) satisfies the following relationship:

$$-3.10 < f_1 X / f_{(1-13)} X < -2.70;$$

$$-2.10 < f_{(2-6)} Y / f_{(1-13)} Y < -1.60;$$

$$-10.20 < f_{(2-6)} X / f_{(1-13)} X < -9.20;$$

$$2.40 < f_{(7-13)} X / f_{(1-13)} X < 2.80;$$

wherein a X direction is a curvature direction of the first lens, and a Y direction is the other direction that is 90 degrees to the curvature direction of the first lens, wherein the subscript number off comprises a number of each lens, wherein $f_{(M-N)}Y$ comprises a combined optical focal length of the total (N−M+1) lens in the Y direction from a Mth lens to a Nth lens, wherein $f_{(M-N)}X$ comprises a combined optical focal length of the total (N−M+1) lens in the X direction from the Mth lens to the Nth lens, wherein M comprises a natural number greater than or equal to 1 and less than N.

4. The super wide-angle large aperture anamorphic lens according to claim 3, wherein the fifth lens (5), the ninth lens (9) and the tenth lens (10) comprise all negative power spherical lens; wherein the sixth lens (6), the seventh lens (7), the eighth lens (8), the eleventh lens (11), the twelfth lens (12) and the thirteenth lens (13) comprise spherical lens with positive power.

5. The super wide-angle large aperture anamorphic lens according to claim 3, wherein the second lens (2) and the third lens (3) are configured to join together.

6. The super wide-angle large aperture anamorphic lens according to claim 3, wherein the eighth lens (8) and the ninth lens (9) are configured to join together.

7. The super wide-angle large aperture anamorphic lens according to claim 1, wherein the generatrix of the fourth lens (4) is perpendicular to the generatrix of the third lens (3).

8. The super wide-angle large aperture anamorphic lens according to claim 1, wherein the second lens (2) and the third lens (3) are configured to join together.

9. The super wide-angle large aperture anamorphic lens according to claim 1, wherein the eighth lens (8) and the ninth lens (9) are configured to join together.

10. The super wide-angle large aperture anamorphic lens according to claim 1, wherein the tenth lens (10) and the eleventh lens (11) are configured to join together.

11. The super wide-angle large aperture anamorphic lens according to claim 1, comprises a length less than 130 mm, and a front end being matched with a 67 mm general filter.

12. The super wide-angle large aperture anamorphic lens according to claim 1, comprises a focal length in the Y direction of 24.4 mm, a focal length in the X direction of 18.3 mm, and an aperture of 2.8.

13. The ultra-wide-angle large-aperture anamorphic lens according to claim 1, comprises a mass less than 750 g.

14. The super wide-angle large aperture anamorphic lens according to claim 1, wherein the tenth lens (10) and the eleventh lens (11) are configured to join together.

15. The super wide-angle large aperture anamorphic lens according to claim 1, comprises a length less than 130 mm, and a front end being matched with a 67 mm general filter.

16. The super wide-angle large aperture anamorphic lens according to claim 1, comprises a focal length in the Y direction of 24.4 mm, a focal length in the X direction of 18.3 mm, and an aperture of 2.8.

17. The ultra-wide-angle large-aperture anamorphic lens according to claim 1, comprises a mass less than 750 g.

* * * * *